Patented Dec. 21, 1943

2,337,421

UNITED STATES PATENT OFFICE 2,337,421

PREPARATION OF NITRILES FROM PRIMARY ALCOHOLS USING CATALYSTS CONTAINING SILVER

Le Roy U. Spence, Elkins Park, and Darrel J. Butterbaugh and Frederick W. Robinson, Philadelphia, Pa., assignors to Röhm & Haas Company, Philadelphia, Pa., a corporation of Delaware No Drawing. Application October 7, 1941, Serial No. 413,972

9 Claims. (Cl. 260—464)

This invention relates to a catalytic process for the preparation of aliphatic and aryl-aliphatic nitriles from primary alcohols and ammonia. It further relates to improvements in the preparation of nitriles from alcohols and ammonia by the action of catalysts containing silver. Furthermore, it pertains to the preparation of specific catalysts, containing silver, which have outstanding merit in increasing the yield of nitriles by the reaction of primary alcohols and ammonia.

In a copending application Ser. No. 413,973, filed October 7, 1941, we have disclosed the use of catalysts containing copper in conjunction with dehydrating oxides. Such catalysts are of substantial value in that they greatly increase the yield of nitriles when primary alcohols and ammonia are reacted in their presence. While such catalysts have activity over a longer period of time than catalysts containing copper alone, they can be improved still more by the addition of silver. Such catalysts of long active life may be considered as being more stable, and their value lies in the fact that they can be used for longer periods of time without regeneration.

According to Hara and Komatzu, Mem. Coll. Sci. Kyoto Imp. Univ., 8A, 241–246 (1925) nitriles may be formed to varying extents when primary alcohols and dry ammonia are slowly passed over reduced copper at 300–330° C. Reported yields were as high as 80% while others were as low as 40%. This serves to indicate that, like catalytic reactions in general, the reaction of alcohols and ammonia is dependent on the choice of a specific catalyst, on the particular methods of preparing the catalyst, and on the careful arrangement of operating conditions. As is customary the case in catalysis, the catalysts of the prior art lose their activity after a relatively short time and thereupon become relatively ineffective, especially from the commercial standpoint.

The object of this invention is to provide an improved process for the manufacture of nitriles by the use of catalysts which have higher activity, thus producing higher yields, and which have greater stability, thus assuring their effectiveness over a prolonged period of time. This improvement is realized by the use of a catalyst containing silver with or without copper and with a dehydrating agent such as $Al_2O_3$, $ZrO_2$, $TiO_2$, $ThO_2$, $CeO_2$ and other rare earth oxides. In many cases the hydrated silicates of the metals have proven to be very effective.

The dehydrating oxide may be co-precipitated with the silver and copper hydroxides or may be separately prepared and coated with the hydroxides or oxides of the metals, silver and copper. Still another method is to impregnate the dehydrating oxide with a solution of decomposable salts, such as the nitrates or acetates, ignite these to the oxides and then reduce to the metals. Other methods known in the art may also be employed in the preparation of the catalyst. The dehydrating agent must be used in a form which is catalytically active and any of the methods, known in the art of preparing dehydrating oxides, may be applied to the preparation of the dehydrating agents for use in this invention.

The preparation of the catalyst is best carried out in such a way that the dehydrating agent is present in the catalyst in a partially dehydrated amorphous form. Aluminum oxide, for example, may be used in the form of the commercially available "Activated Alumina" or may be precipitated from aluminum nitrate with ammonia from hot or cold dilute solutions, or may be made by the hydrolysis of aluminum alcoholates.

While both silver and copper have proven to be effective catalysts independently of each other, generally more satisfactory results, as measured by yield of nitrile and stability of the catalyst can be obtained by the use of silver in conjunction with copper, always, of course, in the presence of the dehydrating agent. The ratio of copper to silver is not critical but it is preferred to have more silver than copper. The simultaneous use of the two metals is especially advantageous in extending the period of activity of the catalyst. Likewise the proportion of the metals to the dehydrating agent is not critical and can be varied over a wide range without seriously affecting the yield of nitriles.

When copper is present, it is preferably derived from the nitrate or acetate rather than from the sulfate. When prepared from the sulfate, the copper may contain traces of sulfate which becomes reduced to the sulfide during the reaction and serves to poison the catalyst.

The oxides of silver and copper, produced by drying the precipitated hydroxides, may be reduced before use or during the reaction of the alcohol and ammonia, inasmuch as hydrogen is one of the products of the catalytic reaction.

Although these catalysts may become inactive on continued use, they do so far less readily than catalysts previously known. Such loss of activity is presumably due to the formation of a deposit which covers the active surfaces of the catalysts. When this occurs, the catalyst can be reactivated readily by a passage of air over the catalyst at the temperature of the reaction. This operation may partially convert the metals to the oxides, after which reduction by hydrogen to the metal can be affected before use with hydrogen from an extraneous source or during the reaction, inasmuch as hydrogen is one of the reaction products.

The temperature range which is preferred for the most satisfactory operation of the process is 300–400° C. although it is to be understood that somewhat lower or higher temperatures are not inoperable. More complete conversion of the alcohol to the nitrile is accomplished by the use of an excess of ammonia over the alcohol. Although the nitrile can be formed in the presence of an excess of alcohol, this method is less satisfactory than when the ammonia is in excess due to the fact that the excess alcohol forms constant boiling mixtures with the nitrile. By using an excess of ammonia with the preferred catalysts of the invention, the crude nitrile can be purified easily by distillation inasmuch as the amount of unconverted alcohol is very small. The recovered excess ammonia and unconverted alcohol can be returned to the catalytic reaction zone for further reaction.

Saturated aliphatic primary alcohols containing two or more carbon atoms may be converted to the nitriles by the process of this invention with very high resultant yields. Examples of such alcohols include ethyl alcohol, normal propyl alcohol, n-butanol, isobutanol, 2-ethyl butanol, n-hexanol, 2-ethyl hexanol, n-octanol, etc. Likewise aryl-aliphatic primary alcohols such as benzyl alcohol, phenylethyl alcohol, etc. may be used. The higher-boiling primary alcohols may be vaporized under reduced pressure and the reaction similarly carried out at reduced pressure.

In the following examples, which serve to illustrate but not to limit the invention, the term "space velocity" means the liters of total vapor (calculated at standard conditions) per liter of catalyst per hour.

The first two examples serve to show that while silver, without an accompanying dehydrating agent, may be used to catalyze the alcohol-ammonia reaction, the yields are relatively low.

*Example 1*

Small spirals of pure silver which previously had been activated were used as catalysts for the preparation of isobutyronitrile from isobutyl alcohol and ammonia. At 200 space velocity a yield of 5.8% of the theoretical yield was obtained.

*Example 2*

Silver nitrate solution was evaporated onto 4–8 mesh pumice and then the pumice was ignited at 450° C. in a stream of air to decompose the silver nitrate. Hydrogen was passed over the catalyst at 360° C. before use. The finished catalyst contained 28% silver by weight, and, when used as a catalyst for the alcohol-ammonia reaction, produced a yield of 38.5% isobutyronitrile from isobutyl alcohol and ammonia at 200 space velocity.

Example 3 serves to illustrate the results of using silver on diatomaceous earth.

*Example 3*

Silver oxide was precipitated from a solution of silver nitrate by the addition of ammonia in the presence of finely divided diatomaceous earth and the filter cake was washed, dried, broken into 4–8 mesh particles and ignited in a stream of air at 400–450° C. before use. This catalyst gave a 41% yield of isobutyronitrile from isobutyl alcohol and ammonia at 150 space velocity.

In Example 4 the effect of using the silver in conjunction with a dehydrating oxide is shown. The substantial increase in yield obtained over that in Examples 1 and 2 where no dehydrating oxide was present is of particular significance.

*Example 4*

Aluminum hydroxide was precipitated from the nitrate with ammonium hydroxide in a cold dilute solution containing suspended finely divided diatomaceous earth. The precipitate was filtered off, thoroughly washed, dried, broken to 4–8 mesh and ignited at 350° C. The aluminum oxide-diatomaceous earth particles were then impregnated with silver nitrate and ignited at 450° C. to decompose the salt. The following results were obtained with this catalyst containing 10% silver by weight in the preparation of isobutyronitrile from isobutyl alcohol and ammonia.

| Hours run | Space velocity | Yield of nitrile |
|---|---|---|
| | | Per cent |
| 3.0 | 200 | 91.9 |
| 3.0 | 400 | 88.9 |
| 7.5 | 200 | 88.9 |

In Example 5 are shown the high yields obtained at high space velocities and also the unusually high degree of stability of the catalyst over a period of many hours.

*Example 5*

Silver was deposited on "Activated Alumina" by the same general method used in Example 2. The finished catalyst contained 15% silver by weight. The following results were obtained in the preparation of isobutyronitrile from isobutyl alcohol and ammonia:

| Hours run | Space velocity | Yield of nitrile |
|---|---|---|
| | | Per cent |
| 3.0 | 200 | 90.0 |
| 7.3 | 400 | 88.2 |
| 13.6 | 400 | 87.1 |
| 21.1 | 400 | 86.0 |
| 4.2 | 570 | 84.3 |

The effect of the presence of copper is shown in the following examples.

*Example 6*

A catalyst was prepared in the same manner as in Example 4 with the exception that the impregnating solution contained both copper nitrate and silver nitrate. The catalyst, so prepared, contained 15% copper, 3% silver, and 41% aluminum oxide by weight. When such catalyst was used in the preparation of isobutyronitrile from isobutyl alcohol and ammonia the following results were obtained:

| Hours run | Space velocity | Yield of nitrile |
|---|---|---|
| | | Per cent |
| 8.0 | 200 | 91.8 |
| 15.1 | 200 | 91.0 |

Example 7

"Activated Alumina," grade A, 4–8 mesh, was impregnated with a solution of copper nitrate and silver nitrate, ignited at 450° C. to the oxides, and reduced with hydrogen before use. The finished catalyst contained 15% copper and 3% silver by weight. The following results were obtained in the preparation of isobutyronitrile and propionitrile from the corresponding alcohols and ammonia:

| Alcohol | Space velocity | Yield of nitrile |
| --- | --- | --- |
| | | Per cent |
| Isobutyl alcohol | 400 | 92.0 |
| n-Propyl alcohol | 200–400 | 79–82 |

Example 8

A catalyst was prepared as indicated in Example 5. Various alcohols were passed over this catalyst together with ammonia, in an alcohol: ammonia ratio of 1:1.5, at a temperature of 360° C. and a space velocity of 200. The catalyst was burned off with air and then reduced with hydrogen before use in each experiment. Following are the yields of nitriles prepared from the corresponding alcohols and ammonia:

| Alcohol | Yield of nitrile |
| --- | --- |
| | Per cent |
| n-Propyl | 64.6 |
| n-Butyl | 86.0 |
| n-Hexyl | 78.3 |

We claim:

1. A process for the preparation of aliphatic and arylaliphatic nitriles from corresponding alcohols which comprises passing a mixture of ammonia and the vapors of a primary alcohol selected from the class consisting of saturated aliphatic alcohols of at least two carbon atoms and arylaliphatic alcohols over a catalyst comprising reduced silver deposited on a partially dehydrated, amorphous, hydrous oxide of a metal selected from the class consisting of aluminum, zirconium, titanium, thorium, and the rare earth metals maintained at a temperature within the range of about 300° to about 400° C.

2. A process for the preparation of aliphatic and arylaliphatic nitriles from the corresponding alcohols which comprises passing a mixture of ammonia and the vapors of a primary alcohol selected from the class consisting of saturated aliphatic alcohols of at least two carbon atoms and arylaliphatic alcohols over a catalyst comprising reduced silver and copper deposited on a partially dehydrated, amorphous, hydrous oxide of a metal selected from the class consisting of aluminum, zirconium, titanium, thorium, and the rare earth metals maintained at a temperature within the range of about 300° to about 400° C.

3. A process for the preparation of aliphatic and arylaliphatic nitriles from the corresponding alcohols which comprises passing a mixture of ammonia and the vapors of a primary alcohol selected from the class consisting of saturated aliphatic alcohols of at least two carbon atoms and arylaliphatic alcohols over a catalyst comprising reduced silver deposited on activated alumina maintained at a temperature within the range of about 300° to about 400° C.

4. A process for the preparation of aliphatic and arylaliphatic nitriles from the corresponding alcohols which comprises passing a mixture of ammonia and the vapors of a primary alcohol selected from the class consisting of saturated aliphatic alcohols of at least two carbon atoms and arylaliphatic alcohols over a catalyst comprising reduced silver deposited on a partially dehydrated, amorphous, hydrous oxide and diatomaceous earth, said oxide being selected from a member of the class consisting of aluminum, zirconium, titanium, thorium, and the rare earth metals, while maintaining the catalyst at a temperature from about 300° C. to about 400° C.

5. A process for the preparation of aliphatic and arylaliphatic nitriles from the corresponding alcohols which comprises passing a mixture of ammonia and the vapors of a primary alcohol selected from the class consisting of saturated aliphatic alcohols of at least two carbon atoms and arylaliphatic alcohols over a catalyst comprising reduced silver deposited on activated alumina and diatomaceous earth, while maintaining the catalyst at a temperature from about 300° C. to about 400° C.

6. A process for the preparation of aliphatic nitriles from the corresponding alcohol which comprises passing a mixture of ammonia and the vapors of a saturated primary aliphatic alcohol of at least two carbon atoms over a catalyst comprising reduced silver on a partially dehydrated, amorphous, hydrous oxide of a metal selected from the class consisting of aluminum, zirconium, titanium, thorium, and the rare earth metals maintained within the range of about 300° C. to about 400° C.

7. A process for the preparation of aliphatic nitriles from the corresponding alcohol which comprises passing a mixture of ammonia and the vapors of a saturated primary aliphatic alcohol of at least two carbon atoms over a catalyst comprising reduced silver on activated alumina maintained within the range of about 300° C. to about 400° C.

8. A process for the preparation of aliphatic nitriles from the corresponding alcohol which comprises passing a mixture of about 1.5 molecular proportions of ammonia and about one molecular proportion of the vapors of a saturated primary aliphatic alcohol of at least two carbon atoms over a catalyst comprising reduced silver on a partially dehydrated, amorphous, hydrous oxide of a metal selected from the class consisting of aluminum, zirconium, titanium, thorium, and the rare earth metals maintained within the range of about 300° C. to about 400° C.

9. A process for the preparation of aliphatic nitriles from the corresponding alcohol which comprises passing a mixture of about 1.5 molecular proportions of ammonia and about one molecular proportion of the vapors of a saturated primary aliphatic alcohol of at least two carbon atoms over a catalyst comprising reduced silver on activated alumina maintained within the range of about 300° C. to about 400° C.

LE ROY U. SPENCE.
DARREL J. BUTTERBAUGH.
FREDERICK W. ROBINSON.